US010379597B2

(12) United States Patent
Manabe

(10) Patent No.: US 10,379,597 B2
(45) Date of Patent: Aug. 13, 2019

(54) PROCESSOR, HOST DEVICE, POWER SAVING METHOD OF USB DEVICE, AND COMPUTER PROGRAM

(71) Applicant: KONICA MINOLTA, INC., Chiyoda-ku, Tokyo (JP)

(72) Inventor: Kenji Manabe, Okazaki (JP)

(73) Assignee: KONICA MINOLTA, INC., Tokyo (JP)

( * ) Notice: Subject to any disclaimer, the term of this patent is extended or adjusted under 35 U.S.C. 154(b) by 161 days.

(21) Appl. No.: 15/437,496

(22) Filed: Feb. 21, 2017

(65) Prior Publication Data

US 2017/0262043 A1 Sep. 14, 2017

(30) Foreign Application Priority Data

Mar. 9, 2016 (JP) ................................. 2016-045179

(51) Int. Cl.
*G06F 1/26* (2006.01)
*G06F 1/3287* (2019.01)
(Continued)

(52) U.S. Cl.
CPC ............ *G06F 1/3287* (2013.01); *G06F 1/266* (2013.01); *G06F 1/3215* (2013.01);
(Continued)

(58) Field of Classification Search
None
See application file for complete search history.

(56) References Cited

U.S. PATENT DOCUMENTS 6,213,879 B1 * 4/2001 Niizuma ............... H04L 7/0008
463/36
6,286,107 B1 * 9/2001 Tamaki .................. G06F 1/3215
713/320

(Continued)

FOREIGN PATENT DOCUMENTS

CN 102739634 A 10/2012
JP 2005196352 A 7/2005

OTHER PUBLICATIONS

Chinese Office Action (and English language translation thereof) dated Oct. 12, 2018 issued in Chinese Application No. 201710124196.9.

(Continued)

*Primary Examiner* — Paul Yen
(74) *Attorney, Agent, or Firm* — Holtz, Holtz & Volek PC

(57) ABSTRACT

A processor capable of executing predetermined processing includes: a communication interface for communicating with a host device which requests the execution of the processing; a main control unit configured to control the execution of the processing; a notification unit which does not proceed to a power saving mode but executes notification processing for allowing the host device to detect that an operating mode of the main control unit is in the power saving mode when the main control unit proceeds to the power saving mode reducing power consumption; and a state switching unit configured to allow the communication interface to proceed to a power saving state of which power consumption is smaller than that of a normal state when the communication interface receives a power saving command from the host device.

7 Claims, 15 Drawing Sheets

(51) Int. Cl.
*G06F 1/3234* (2019.01)
*G06F 1/3296* (2019.01)
*G06F 1/3215* (2019.01)

(52) U.S. Cl.
CPC .......... *G06F 1/3253* (2013.01); *G06F 1/3278* (2013.01); *G06F 1/3284* (2013.01); *G06F 1/3296* (2013.01); *Y02D 10/157* (2018.01); *Y02D 10/159* (2018.01); *Y02D 50/20* (2018.01)

(56) References Cited

U.S. PATENT DOCUMENTS

| 6,523,126 B1* | 2/2003 | Brabenac | G06F 1/3209 |
| | | | 340/3.1 |
| 8,700,819 B2 | 4/2014 | Dalal et al. | |
| 2003/0105983 A1* | 6/2003 | Brakmo | G06F 1/3203 |
| | | | 713/320 |
| 2011/0161711 A1* | 6/2011 | Takamoto | G06F 1/3228 |
| | | | 713/324 |
| 2012/0233361 A1 | 9/2012 | Dalal et al. | |
| 2015/0268716 A1* | 9/2015 | Cheong | G06F 1/3256 |
| | | | 713/323 |
| 2016/0315998 A1* | 10/2016 | Johnson | G06N 5/04 |

OTHER PUBLICATIONS

European Office Action dated Nov. 22, 2018 issued in European Application No. 17157603.6.

Chinese Office Action (and English language translation thereof) dated Apr. 29, 2019 issued in Chinese Application No. 201710124196.9.

* cited by examiner

PROCESSOR, HOST DEVICE, POWER SAVING METHOD OF USB DEVICE, AND COMPUTER PROGRAM

The entire disclosure of Japanese Patent Application No. 2016-045179 filed on Mar. 9, 2016 including description, claims, drawings, and abstract are incorporated herein by reference in its entirety.

BACKGROUND OF THE INVENTION

Field of the Invention

The present invention relates to a processor, a host device, a power saving method of a USB device, and a computer program.

Description of the Related Art

In general, a processor such as a printer or an image reader is connected to a host device such as a personal computer to communicate with each other. The processor executes predetermined processing such as printing or reading of an image according to a command from the host device.

There is a universal serial bus (USB) as one of means for connecting a processor to a host device. In a case where the host device which is a USB host proceeds to a power saving mode reducing the power consumption thereof in a state of being connected by the USB, in the processor which is a USB device, a device side USB interface for USB communication is in a power saving state which is referred to as suspend.

In the related art, there is a technology disclosed in JP 2005-196352 A, as a technology of related art for allowing the USB device to return the USB host to a normal mode from the power saving mode.

In JP 2005-196352 A, it is disclosed that when the USB device returns to the normal mode, a switch which pulls up a data line (D+) of the USB interface is turned on, and thus, the USB host returns to the normal mode.

There is a case where the processor uniquely proceeds to the power saving mode without receiving a command from the host device. That is, there is a case where the processor proceeds to the power saving mode even when the host device is in the normal mode without proceeding to the power saving mode. For example, when a user uses a personal computer which is a host device, a printer which is a processor connected to the personal computer is usually in the power saving mode in a case where the printer is not used for a while.

When the processor proceeds to the power saving mode, energization to a central processing unit (CPU) of a controller controlling the operation of the processor is suppressed.

However, the processor is not capable of uniquely setting a device side USB interface to be in the power saving state. For this reason, in a case where the host device which is connected to the processor by the USB is in the normal mode, the device side USB interface is not in the power saving state, and thus, power is wastefully consumed by the device side USB interface in the processor.

Recently, regulations on standby power, such as European Lot26, become restrictive, and thus, power saving is further required. For this reason, it is necessary to suppress wasteful power consumption in the processor as much as possible.

The technology of JP 2005-196352 A is a technology for returning the host device to the normal mode from the power saving mode, and thus, is not capable of solving a problem which occurs in a case where the host device is in the normal mode.

SUMMARY OF THE INVENTION

The present invention has been made in consideration of the circumstances described above, and an object of the present invention is to further save the power of a processor including a communication interface which is not capable of uniquely controlling power consumption, compared to the related art.

To achieve the abovementioned object, according to an aspect, a processor capable of executing predetermined processing, reflecting one aspect of the present invention comprises: a communication interface for communicating with a host device which requests the execution of the processing; a main control unit configured to control the execution of the processing; a notification unit which does not proceed to a power saving mode but executes notification processing for allowing the host device to detect that an operating mode of the main control unit is in the power saving mode when the main control unit proceeds to the power saving mode reducing power consumption; and a state switching unit configured to allow the communication interface to proceed to a power saving state of which power consumption is smaller than that of a normal state when the communication interface receives a power saving command from the host device.

The communication with the host device is preferably USB communication using the processor as a USB device, the communication interface preferably includes a USB device controller, and the notification unit and the state switching unit are preferably provided in the USB device controller.

The notification unit preferably sets a power saving flag indicating that the operating mode of the main control unit is in the power saving mode in a memory which is able to be monitored by the host device in the communication interface, as the notification processing.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
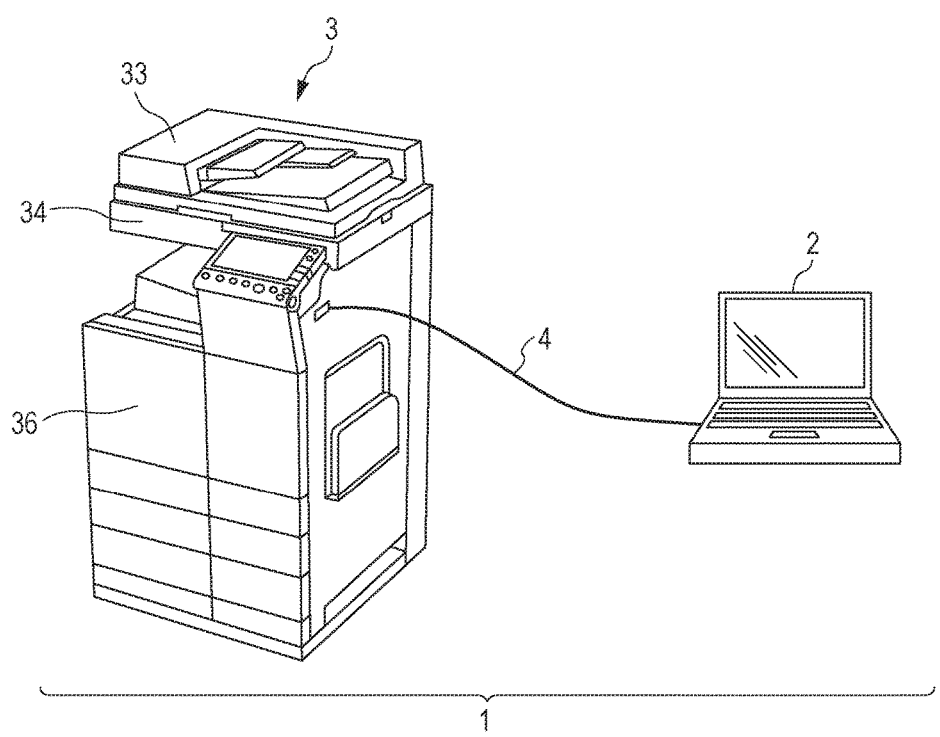
FIG. 1 is a diagram illustrating a configuration of a processing system according to an embodiment of the present invention.

In FIG. 1, a configuration of a processing system 1 according to an embodiment of the present invention is illustrated. The processing system 1 includes a processor 3 which is capable of executing predetermined processing and a host device 2 which requests the execution of the processing to the processor 3.

The processor 3, for example, is a complex machine having a plurality of functions, such as a MFP, and is capable of executing processing of printing an image on paper, processing of reading an image on a document sheet and of transmitting image data to the host device 2, and the like.

The host device 2, for example, is a personal computer. Information equipment such as a smart phone, a tablet, a personal digital assistant (PDA), and a digital camera can be used as the host device 2.

The processor 3 and the host device 2, for example, are connected to communicate with each other by a USB cable 4. In the connection of the USB cable 4, the host device 2 is a USB host, and the processor 3 is a USB device.

Figure 2:
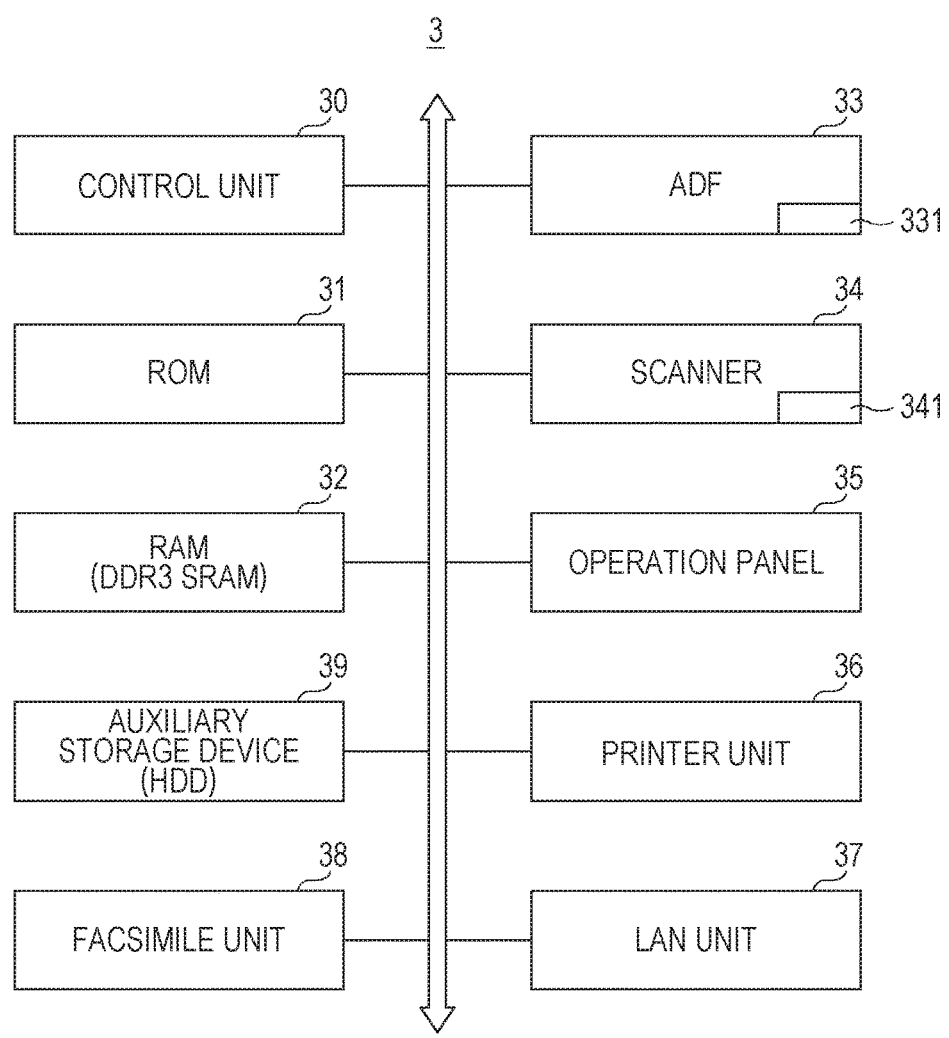
FIG. 2 is a diagram illustrating a schematic hardware configuration of a processor.
Figure 3:
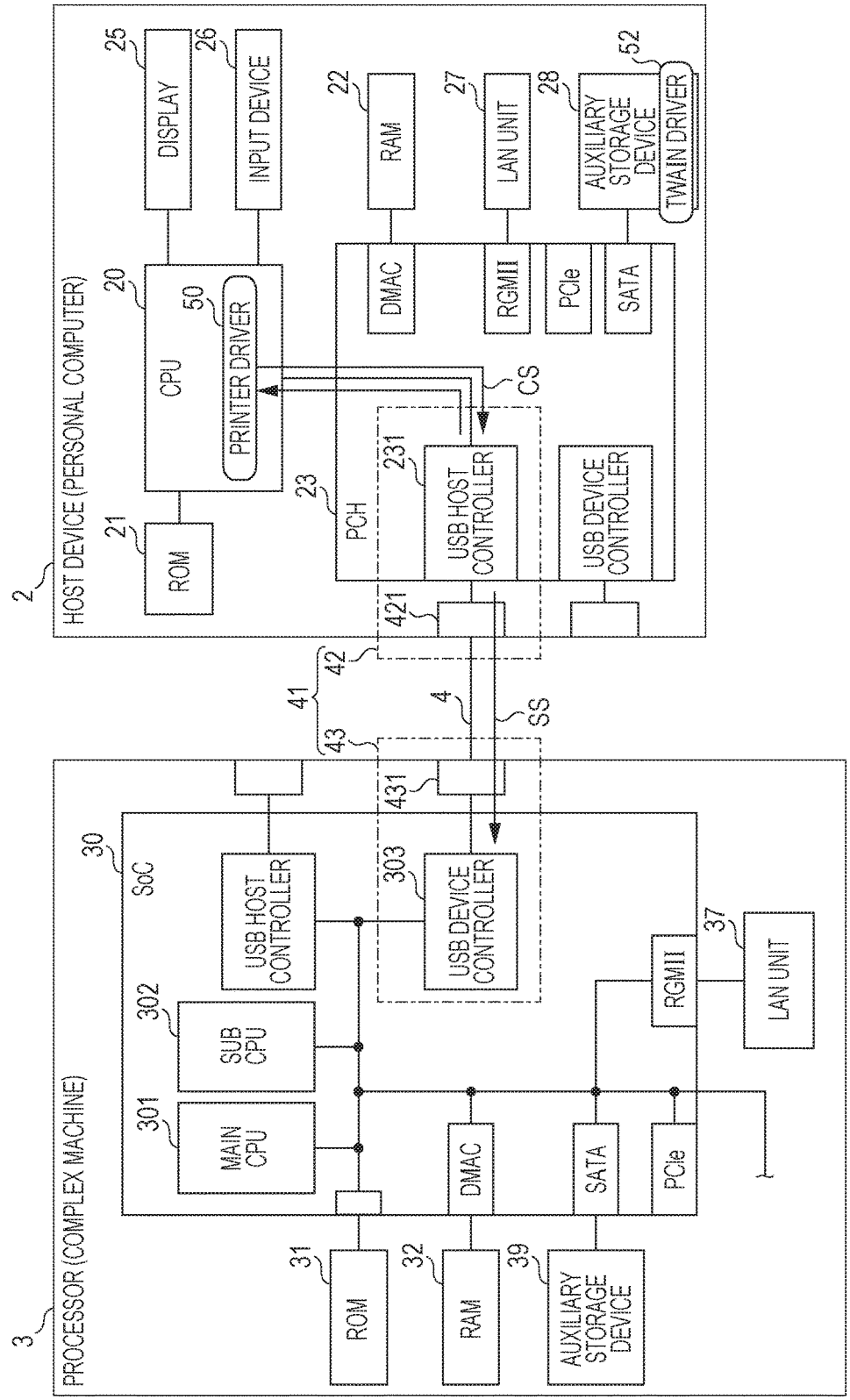
FIG. 3 is a diagram illustrating an example of hardware configurations of main parts of the processor and main parts of a host device.

In FIG. 2, a schematic hardware configuration of the processor 3 is illustrated, and in FIG. 3, an example of hardware configurations of main parts of the processor 3 and main parts of the host device 2 is illustrated.

As illustrated in FIG. 2, the processor 3 includes a control unit 30, a ROM 31, a RAM 32, an automatic document feeder (ADF) 33, a scanner 34, an operation panel 35, a printer unit 36, a LAN unit 37, a facsimile unit 38, and an auxiliary storage device 39.

The control unit 30 is a controller which performs the overall control of the processor 3. As illustrated in FIG. 3, the control unit 30 is configured of a system on chip (SoC) in which a plurality of functions are integrated. The control unit 30 contains a main CPU 301, a sub CPU 302, a USB device controller 303, various interfaces for exchanging signals with an external device, and the like.

The main CPU 301 is a main control unit which controls the execution of various processing such as printing, image reading, and facsimile transmitting and receiving. The sub CPU 302 performs interrupt processing of controlling the energization to the main CPU 301, and the like. The USB device controller 303 extracts data from a received packet, delivers the extracted data to the main CPU 301, incorporates the data input from the main CPU 301 into a packet, and transmits the incorporated data.

In order to operate the processor 3 as an image forming device forming a printing image, an image reading device generating scan image data, and the like, a program controlling the automatic document feeder 33, the scanner 34, the printer unit 36, and the like is stored in the ROM 31.

The RAM 32 is a main storage device which is used by the main CPU 301 or the like in the execution of a program. A program is loaded into the RAM 32 from the ROM 31 or the auxiliary storage device 39 as necessary.

The automatic document feeder 33 transports one or a plurality of document sheets set in a paper feed tray to a paper discharge tray, and optically reads out the image on the document sheet during the transport. The automatic document feeder 33 includes a sensor 331 for detecting that the document sheet is set in the paper feed tray.

The scanner 34 optically reads out the image from the document sheet placed on platen glass. The scanner 34 includes a sensor 341 for detecting that the document sheet is placed on the platen glass.

The automatic document feeder 33 and the scanner 34 feed image data indicating a gradation value of each pixel of the read image to the control unit 30.

The operation panel 35 includes a touch panel display displaying a screen or the like for an instruction or information input from a user, and a key input unit in which a hardware key such as a start key and a stop key is disposed. The operation panel 35 feeds a signal according to the input of the user to the control unit 30.

In copying, printing through a LAN (PC printing), printing through a USB (USB printing), and facsimile receiving, the printer unit 36 is an image forming unit printing an image on paper on the basis of the image data input from the control unit 30. The printer unit 36, for example, forms a printing image by electrophotography. The printer unit 36 includes a paper feeding cassette for containing paper, and the paper is used by being fed from the paper feeding cassette.

The LAN unit 37 is a network interface for communicating with equipment other than the host device 2 through a LAN line. The facsimile unit 38 exchanges the image data with an external facsimile terminal by using a protocol such as G3.

The auxiliary storage device 39 stores the image data fed from the control unit 30, a document fed from external equipment, a program installed by the user, and the like. A hard disk drive (HDD), a solid state drive (SSD), or the like is used as the auxiliary storage device 120.

As illustrated in FIG. 3, the processor 3 includes a device side USB interface 43 as a communication interface for communicating with the host device 2. The device side USB interface 43 is configured of the USB device controller 303 and a connector unit 431.

On the other hand, as illustrated in FIG. 3, the host device 2 includes a CPU 20, a ROM 21, a RAM 22, a platform controller hub (PCH) 23, a display 25, an input device 26, a LAN unit 27, an auxiliary storage device 28, and the like.

The CPU 20 loads a printer driver 50, which is a program for a user to use the processor 3 as a printer, into the RAM 22 from the auxiliary storage device 28 and executes the printer driver 50. In addition, when the processor 3 is used as an image reading device, the CPU 20 loads a TWAIN driver 52, which is a program for transmitting the data of the read image to the host device 2, into the RAM 22 from the auxiliary storage device 28 and executes the TWAIN driver 52.

The PCH 23 includes a USB host controller 231, and various interfaces for exchanging signals with the CPU 20 and a plurality of external devices (the RAM 22 and the like). The USB host controller 231 extracts the data from the received packet, delivers the extracted data to the CPU 20, incorporates the data input from the CPU 20 into a packet, and transmits the incorporated data.

The host device 2 includes a host side USB interface 42 as a communication interface for communicating with the processor 3. The host side USB interface 42 is configured of the USB host controller 231 and a connector unit 421. Then, a USB interface 41 connecting the processor 3 to the host device 2 to communicate with each other is configured of the host side USB interface 42, the device side USB interface 43 of the processor 3, and the USB cable 4.

When a state without any operation of the user and any access from an external device (a so-called non-operating state) continues for a predetermined period of time of shorter than 20 minutes, the processor 3 automatically proceeds to a power saving mode (a sleep mode) in which the power consumption of the main CPU 301 as the main control unit is smaller than the power consumption of the main CPU 301 in a normal mode. In addition, even when the user operates a key for instructing the proceeding, the processor 3 proceeds to the power saving mode. Furthermore, in the power saving mode, a control target of the main CPU 301, such as the scanner 34 or the printer unit 36, is also in a state where the power consumption is reduced.

In addition, the USB device controller 303 has a power saving function of reducing the power consumption thereof. That is, when the transmission of a start of frame (SOF) of the USB host controller 231 in the host device 2 is blocked for longer than or equal to 3 ms, or when a power saving command SS (a suspend signal) is issued, the USB device controller 303 proceeds from a normal state to a power saving state of which the power consumption is smaller than that of the normal state. As the processing of the proceeding, for example, the generation of a clock is stopped in the USB device controller 303, and an operation requiring the clock is paused.

However, such a power saving function of the USB device controller 303 is independent from the control of the processor 3 of the control unit 30, according to the USB provisions. That is, the control unit 30 is not capable of uniquely allowing the USB device controller 303 to proceed to the power saving state from the normal state without depending on the host device 2.

Therefore, in the processing system 1 of this embodiment, in order to save the power of the processor 3, the USB device controller 303 is prevented from being in the normal state and from wastefully consuming the power despite the fact that the main CPU 301 is in the power saving mode. Hereinafter, such a power saving mechanism will be described.

Figure 4:
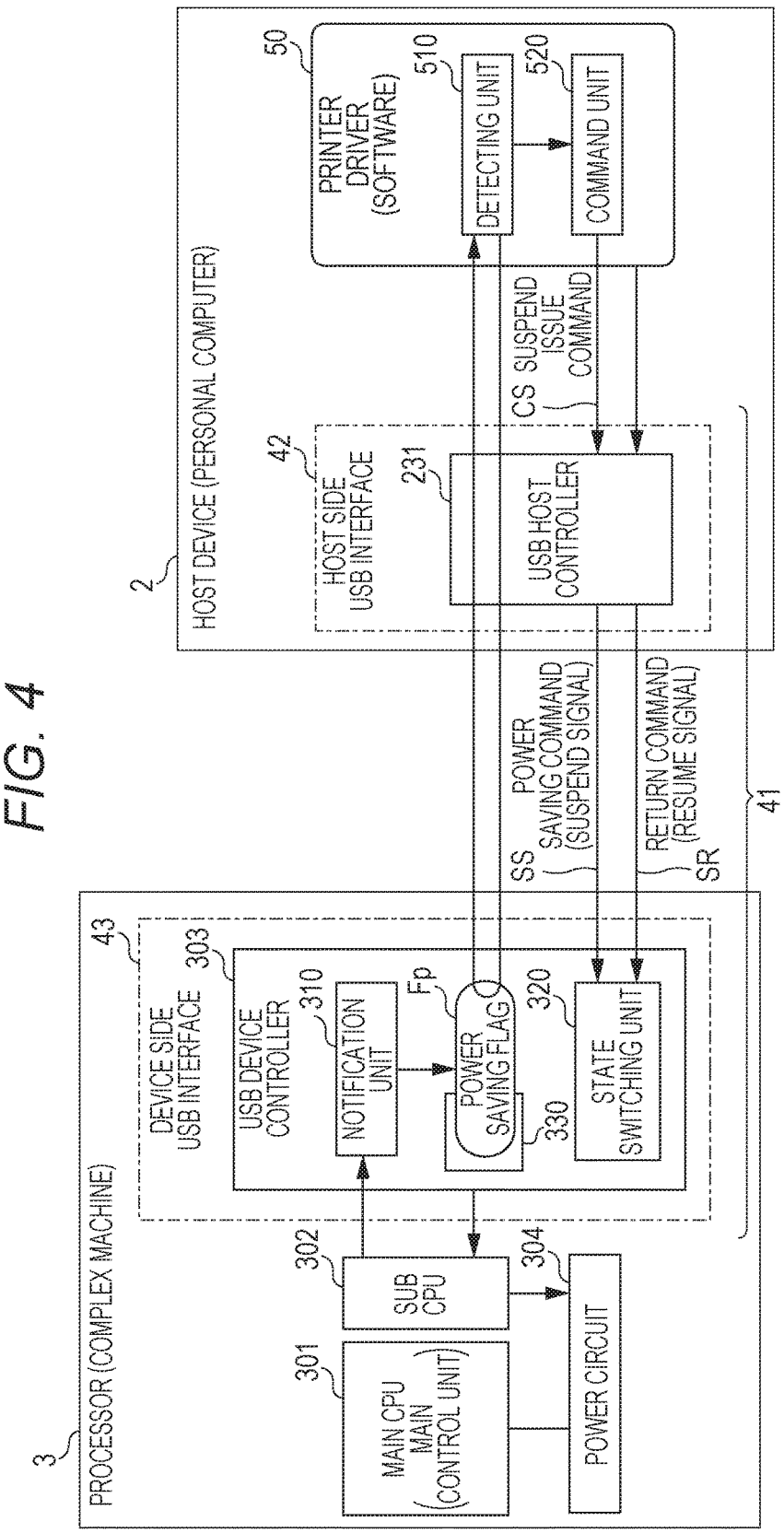
FIG. 4 is a diagram illustrating functional configurations of the processor and the host device.

In FIG. 4, functional configurations of the processor 3 and the host device 2 are illustrated.

In FIG. 4, the processor 3 includes a notification unit 310 and a state switching unit 320. Such functions are provided in the USB device controller 303, and are realized by the hardware of the USB device controller 303 and a program (a computer program) which is executed by the hardware.

When the main CPU 301 (the main control unit) proceeds to the power saving mode reducing the power consumption, the notification unit 310 does not proceed to the power saving mode, but executes notification processing for allowing the host device 2 to detect that an operating mode of the main CPU 301 is in the power saving mode.

For example, as the notification processing, a power saving flag Fp indicating the operating mode of the main CPU 301 is in the power saving mode is set in a memory 330 which can be monitored by the host device 2 in the device side USB interface 43. A control register which is contained in the USB device controller 303 is used as the memory 330, and one bit of the register can be used as the power saving flag Fp. A state where a bit value, for example, is set to "1" is a flag on state where the power saving flag Fp is set, and a state where the bit value, for example, is set to "0" is a flag off state where the power saving flag Fp is not set. Furthermore, the flag on state indicates "the power saving flag Fp is turned on", and the flag off state indicates "the power saving flag Fp is turned off".

Alternatively, the notification unit 310 transmits a power saving notification reporting that the main CPU 301 proceeds to the power saving mode to the host device 2 by the communication of the device side USB interface 43, as notification processing. The power saving notification may be transmitted to the printer driver 50 which is executed in the host device 2.

The execution of the notification processing is an example that the processor 3 which is the USB device requests the transmission of the power saving command SS as a suspend command to the host device 2 which is the USB host.

When the device side USB interface 43 receives the power saving command SS from the host device 2, the state switching unit 320 allows the device side USB interface 43 to proceed to the power saving state of which the power consumption is smaller than that of the normal state.

When the device side USB interface 43 receives a return command (a resume signal) SR from the host device 2, the state switching unit 320 allows the device side USB interface 43 to proceed to the normal state from the power saving state. In a case where the power saving flag Fp is set as the notification processing, the notification unit 310 switches the power saving flag Fp to be in the flag off state where the power saving flag Fp is not set when the state switching unit 320 allows the device side USB interface 43 to proceed to the normal state. Then, when the device side USB interface 43 proceeds to the normal state, the main CPU 301 proceeds to the normal mode of which the power consumption is larger than that of the power saving mode.

When the device side USB interface 43 is in the power saving state, there is a case where the main CPU 301 proceeds to the normal mode. That is, there is a case where any access is performed with respect to the processor 3 not through the USB interface 41. For example, there is a case where the user operates the operation panel 35, or the execution of the processing is requested through the LAN. Thus, in a case where the main CPU 301 proceeds to the normal mode due to a factor other than the return of the USB interface 41 to the normal state, the notification unit 310 retains the flag on state in which the power saving flag Fp is set, and the state switching unit 320 retains the device side USB interface 43 in the power saving state.

In a case where the printer driver 50 which is software for requesting the execution of printing processing in the host device 2 is in a state of receiving input from the user, the notification unit 310 does not set the power saving flag Fp regardless of whether or not the main CPU 301 proceeds to the power saving mode. The state of receiving the input from the user, for example, is a state of displaying the screen which is intentionally activated by the user and is for the user to confirm the state of the processor 3 or set printing conditions on the display 25. Furthermore, such a state of the host device 2 is notified to the USB device controller 303 on a timely basis. In the state of receiving the input from the user, it is expected that any instruction to perform the communication of the USB interface 41 is shortly provided by the user. The power saving flag Fp is not set, and thus, it is possible to retain the device side USB interface 43 in the normal state, and to make responsiveness with respect to the instruction of the user excellent. Furthermore, in this case, the main CPU 301 may not proceed to the power saving mode.

In a state where the operating mode of the main CPU 301 is in the power saving mode, in a case where the TWAIN driver 52 (refer to FIG. 3) requesting the execution of data transmission to the host device 2 is activated by the host device 2, the state switching unit 320 allows the device side USB interface 43 to proceed to the normal state. At this time, the state switching unit 320 waits for the completion of the preparation of transmitting data indicating that the document sheet is set in the automatic document feeder 33 or the scanner 34, and allows the device side USB interface 43 to proceed to the normal state.

On the other hand, the host device 2 includes a detecting unit 510 and a command unit 520. Such functions are realized by software (a device driver) requesting the execution of specific processing to the processor 3 and the CPU 20 executing the software. In FIG. 4, the detecting unit 510 and the command unit 520 are realized by the printer driver 50.

The detecting unit 510 detects that the operating mode of the processor 3 is in the power saving mode. For example, the detecting unit 510 monitors the power saving flag Fp of the processor 3 through the USB host controller 231, and detects that the power saving flag Fp is in the flag on state as being in the power saving mode. Alternatively, the detecting unit 510 detects that the proceeding of the main CPU 301 to the power saving mode is notified from the notification unit 310 of the processor 3, as being in the power saving mode.

When the detecting unit 510 detects that the operating mode of the processor 3 is in the power saving mode, the detecting unit 510 notifies the effect to the command unit 520.

When the detecting unit 510 detects that the operating mode of the processor 3 is in the power saving mode, the command unit 520 commands the host side USB interface 42 to transmit the power saving command SS (the suspend signal) to the device side USB interface 43. That is, a suspend issue command CS, which is a command of issuing (that is, transmitting) the power saving command SS, is imparted to the USB host controller 231. The USB host controller 231 transmits the power saving command SS according to the suspend issue command CS. As described above, the power saving command SS is a command for allowing the device side USB interface 43 of the processor 3 to proceed to the power saving state from the normal state. The state switching unit 320 of the processor 3 allows the device side USB interface 43 to proceed to the power saving state according to the power saving command SS.

Figure 5:
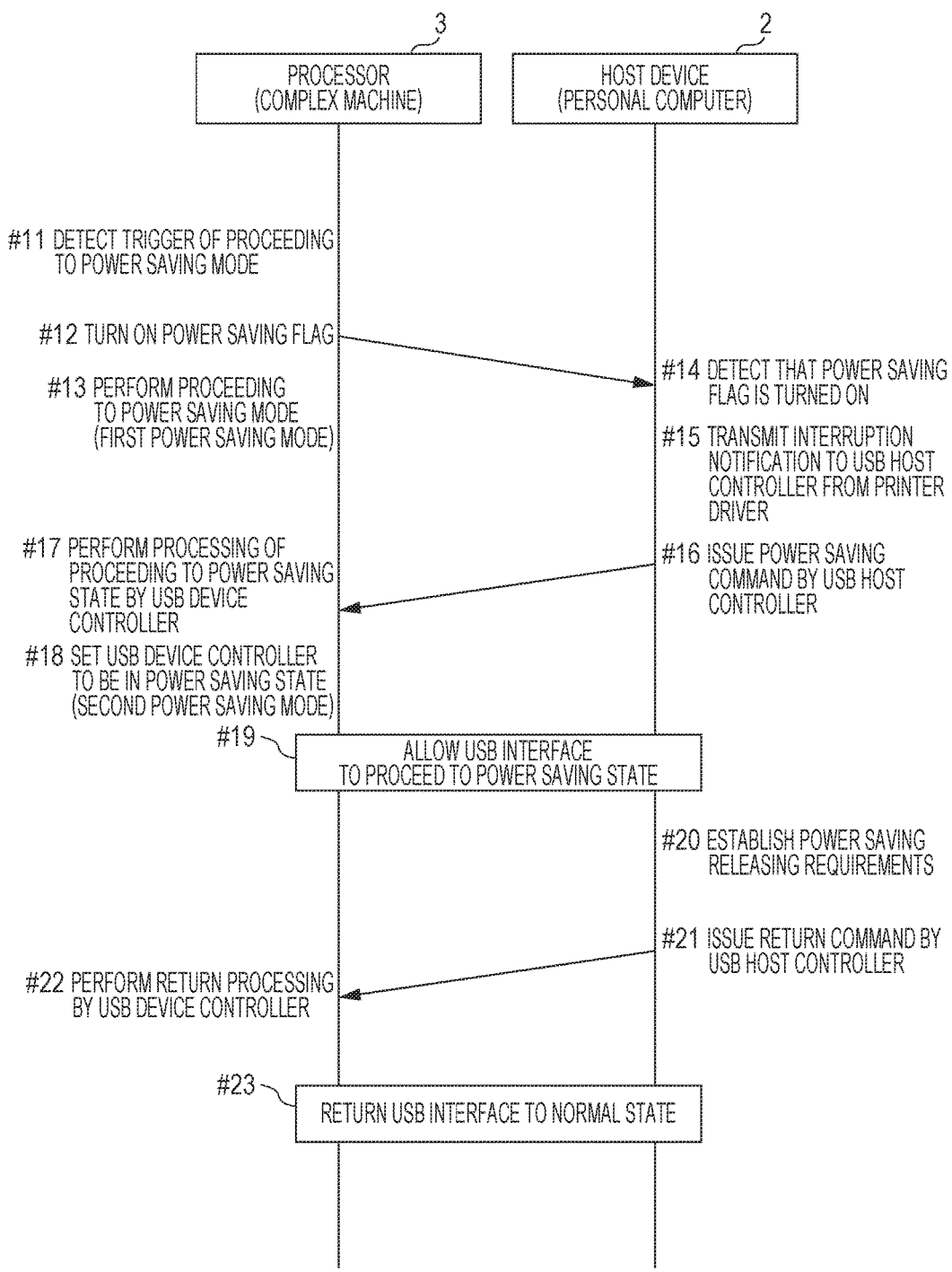
FIG. 5 is a sequence diagram illustrating procedures of suspend proceeding and suspend releasing of a USB interface.

In FIG. 5, procedures of suspend proceeding and suspend releasing of the USB interface 41 are illustrated.

The processor 3 detects a trigger of the proceeding to the power saving mode (#11), sets the power saving flag Fp (#12), and proceeds to the power saving mode (#13). The power saving mode in such a stage is a first power saving mode in which the USB device controller 303 consumes power in the normal state.

When the host device 2 detects the flag on state (#14), the host device 2 commands the USB host controller 231 to issue the power saving command SS by an interruption notification (#15), and transmits the power saving command SS to the processor 3 (#16). In addition, the host device 2 allows the host side USB interface 42 to proceed to the power saving state (the suspend state).

When the processor 3 receives the power saving command SS, the processor 3 starts the proceeding of the USB device controller 303 to the power saving state (#17). The proceeding of the USB device controller 303 to the power saving state is completed, and thus, the processor 3 is in a second power saving mode of which the power consumption is smaller than that of the first power saving mode (#18). Thus, the USB interface 41 is in the power saving state (#19).

For example, when power saving releasing requirements that the user instructs the printer driver 50 to execute printing are established (#20), the host device 2 transmits the return command SR to the processor 3 (#21). In addition, the host device 2 allows the host side USB interface 42 to proceed to the normal state (a suspend releasing state). When the processor 3 receives the return command SR, the USB device controller 303 performs return processing and proceeds to the normal state (#22). Thus, the USB interface 41 returns to the normal state (#23).

Hereinafter, the flow of the processing in the processing system 1 will be described with reference to a flowchart.

Figure 6:
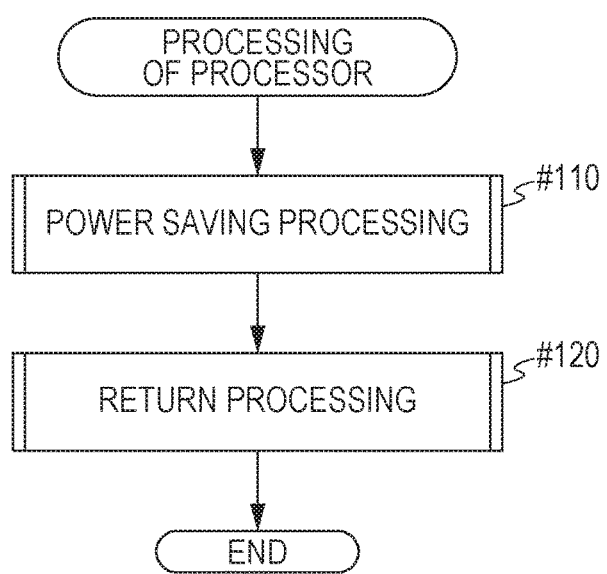
FIG. 6 is a flowchart illustrating a schematic flow of processing in the processor.

In FIG. 6, a schematic flow of the processing in the processor 3 is illustrated. The processor 3 executes power saving processing of setting the USB device controller 303 to be in the power saving state (#110) and return processing of returning the USB device controller 303 to the normal state (#120).

Figure 7:
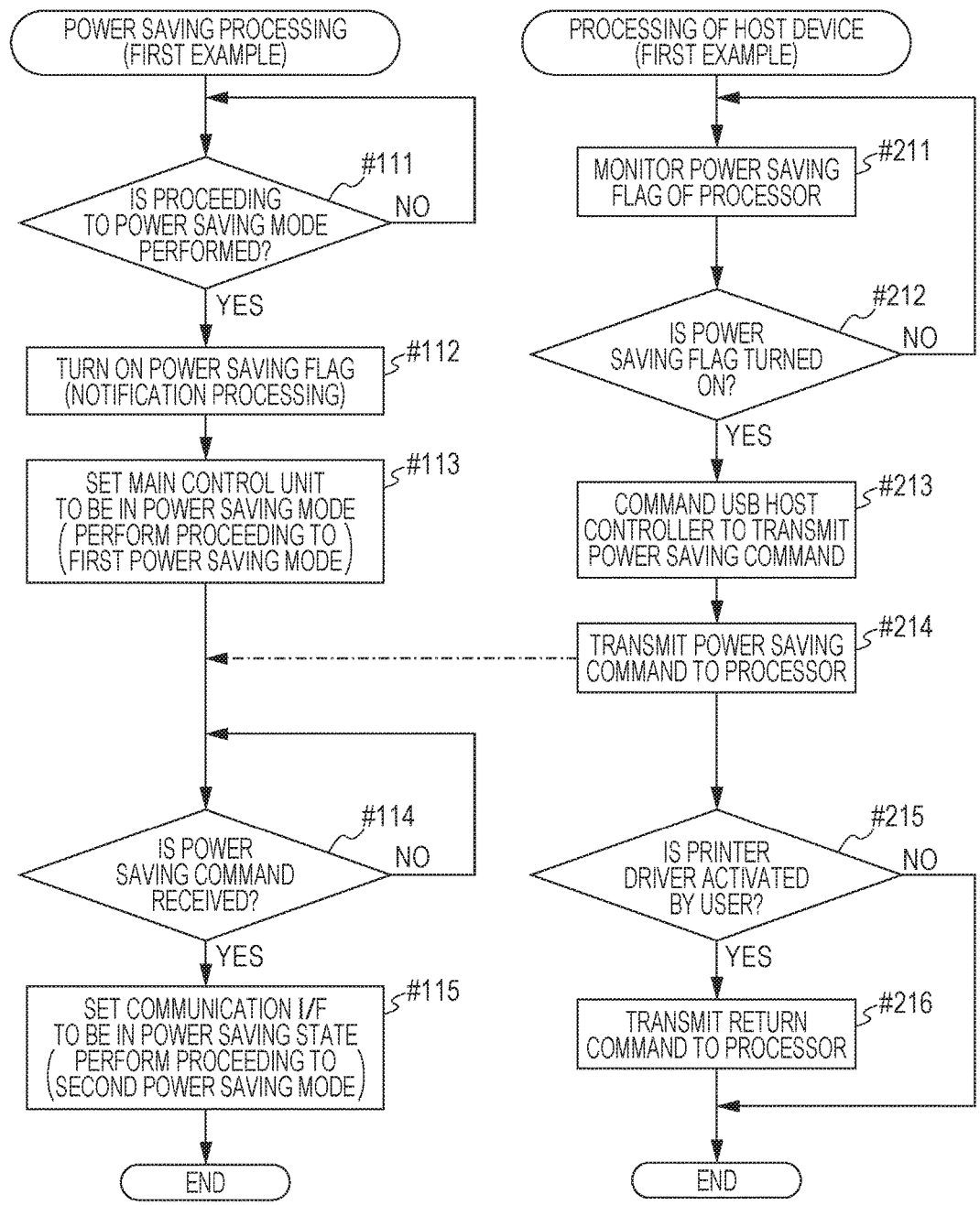
FIG. 7 is a flowchart illustrating a flow of a first example of power saving processing in the processor and a flow of a first example of processing in the host device.

In FIG. 7, the flow of a first example of the power saving processing in the processor 3 and the flow of a first example of the processing in the host device 2 are illustrated.

The processor 3 determines whether or not the proceeding to the power saving mode is performed (#111). At this time, in a case where a timer counting a period of time for the non-operating state is turned off or an operation of instructing the proceeding to the power saving mode is performed, it is determined that the proceeding to the power saving mode is performed.

In a case where the proceeding to the power saving mode is performed (YES in #111), the power saving flag Fp is turned on as the notification processing (#112). Then, the operating mode of the main CPU 301 which is the main control unit is in the power saving mode (#113). After that, the processor 3 waits for the transmission of the power saving command SS from the host device 2 (#114), and when the power saving command SS is received (YES in #114), the device side USB interface 43 is in the power saving state (#115).

On the other hand, the host device 2 performs polling of detecting the state of the power saving flag Fp in the processor 3 at a predetermined cycle (#211).

When the flag on state is detected (YES in #212), the USB host controller 231 is commanded to transmit the power saving command SS (#213), and transmits the power saving command SS to the processor 3 (#214).

After that, when the host device 2 is activated by the printer driver 50 and is in the state of receiving the input from the user (YES in #215), the host device 2 transmits the return command SR to the processor 3 (#216).

Figure 8:
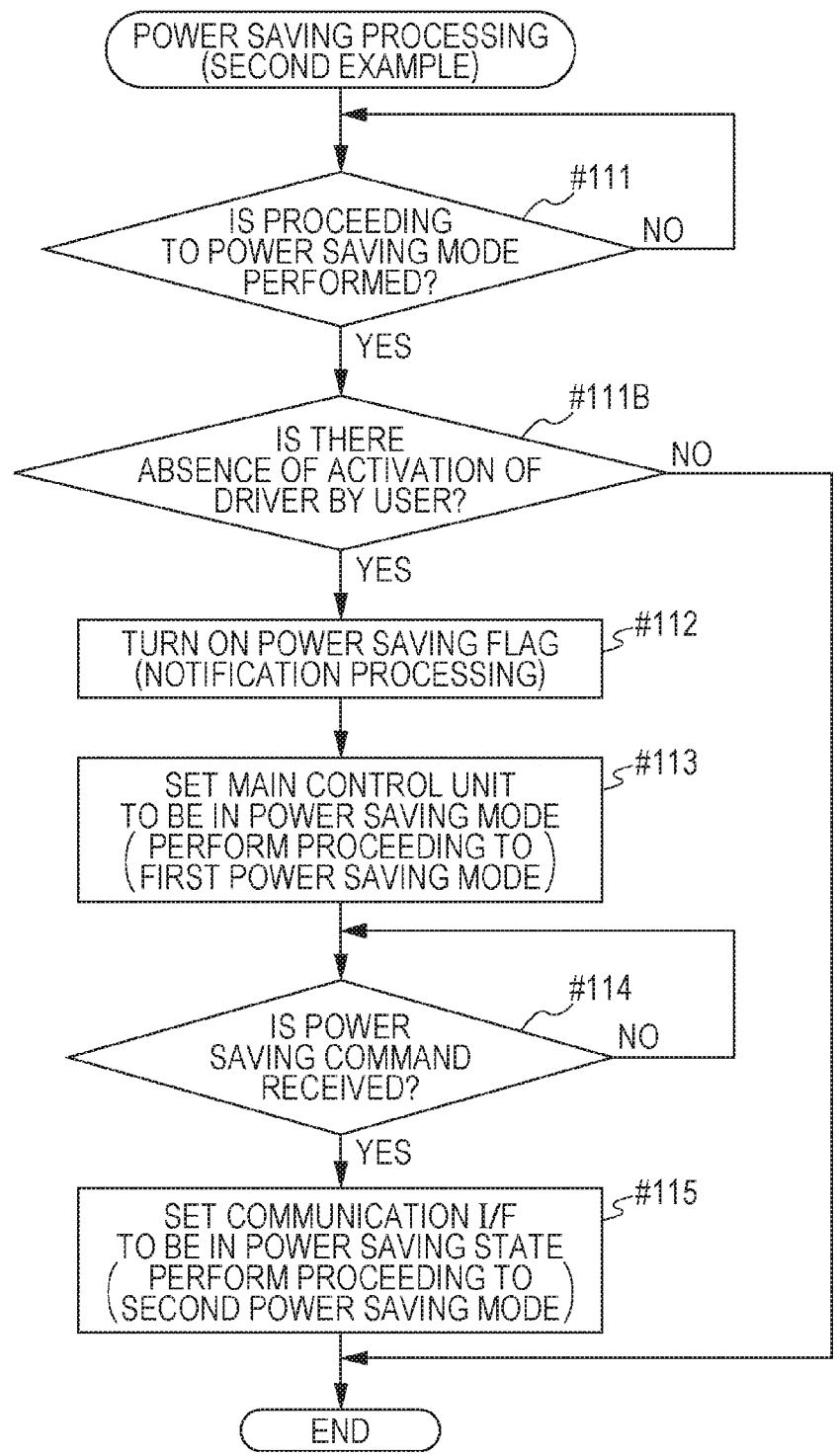
FIG. 8 is a flowchart illustrating the flow of the first example of the power saving processing in the processor.

In FIG. 8, the flow of a second example of the power saving processing in the processor 3 is illustrated. A basic flow of this second example is similar to the flow of the first example illustrated in FIG. 7. The characteristics of the second example, which are not in the first example, include checking whether or not the other device driver for accessing the printer driver 50 or the processor 3 are activated by the user in the host device 2 (#111B), subsequent to the determination in Step #111.

When the device driver is activated in the host device 2, the effect is notified to the USB device controller 303. When the USB device controller 303 receives the notification, the USB device controller 303 writes data indicating that the device driver is activated on the register (the memory 330) in the USB device controller 303. In Step #111B, the presence or absence of the activation of the device driver is detected with reference to the data in the register.

In a case where the device driver is not activated (YES in #111B), the process proceeds to Step #112, and the power saving flag Fp is turned on as with the first example.

In contrast, in a case where the device driver is activated (NO in #111B), the processing of the flow of FIG. 8 ends. That is, in a case where it is expected that the transmission and the reception of the data are shortly performed by using the USB interface 41, in order to enable the transmission and the reception to be more rapidly started, the USB device controller 303 is retained in the normal state.

Figure 9:
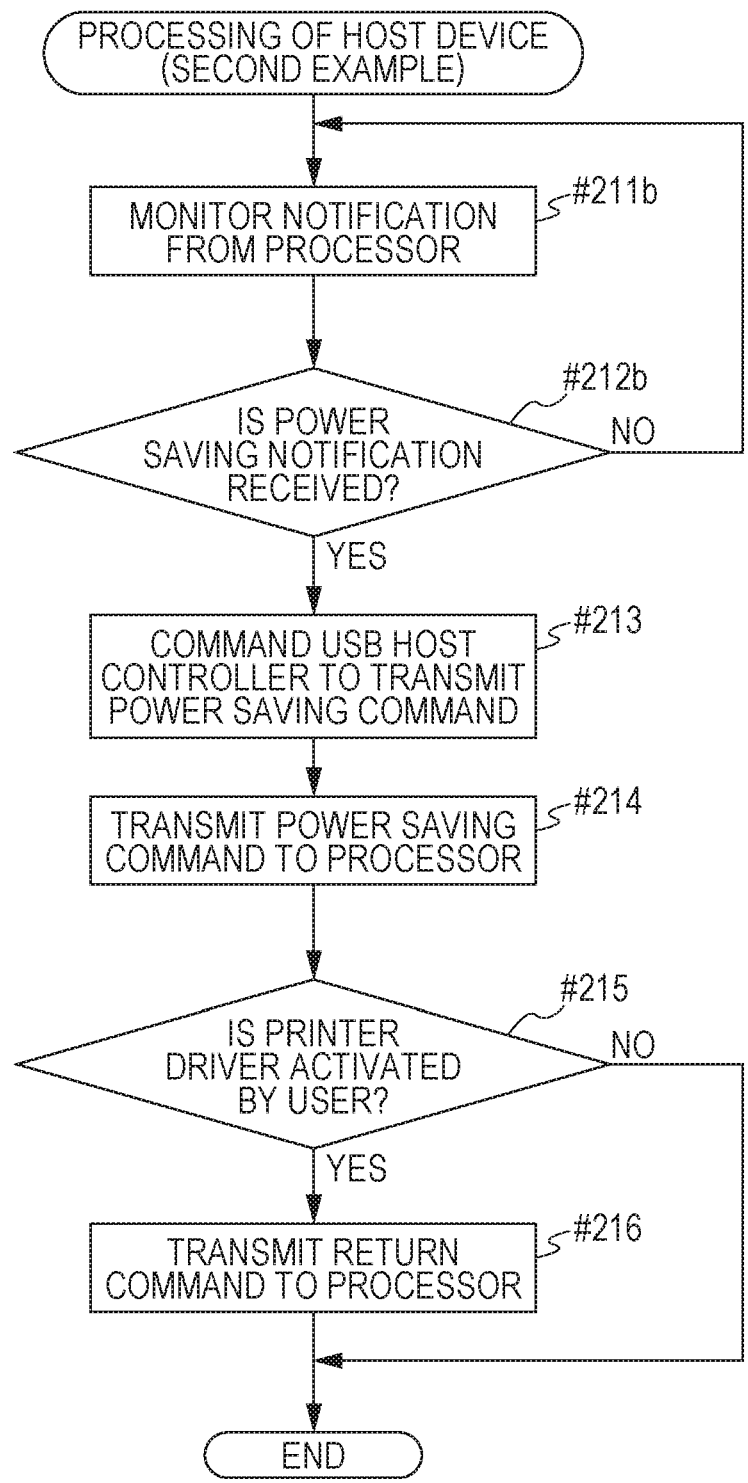
FIG. 9 is a flowchart illustrating a flow of a second example of the processing in the host device.

In FIG. 9, the flow of a second example of the processing in the host device 2 is illustrated. A basic flow of this second example is similar to the flow of the first example illustrated in FIG. 7. Differences are as follows. In the first example, it is determined whether or not the processor 3 requests the transmission of the power saving command SS by detecting the state of the power saving flag Fp, in Steps #211 and #212. In contrast, in the second example, it is determined whether or not the processor 3 requests the transmission of the power saving command SS by detecting the presence or absence of the power saving notification from the processor 3, in Steps #211*b* and #212*b*.

Figure 10:
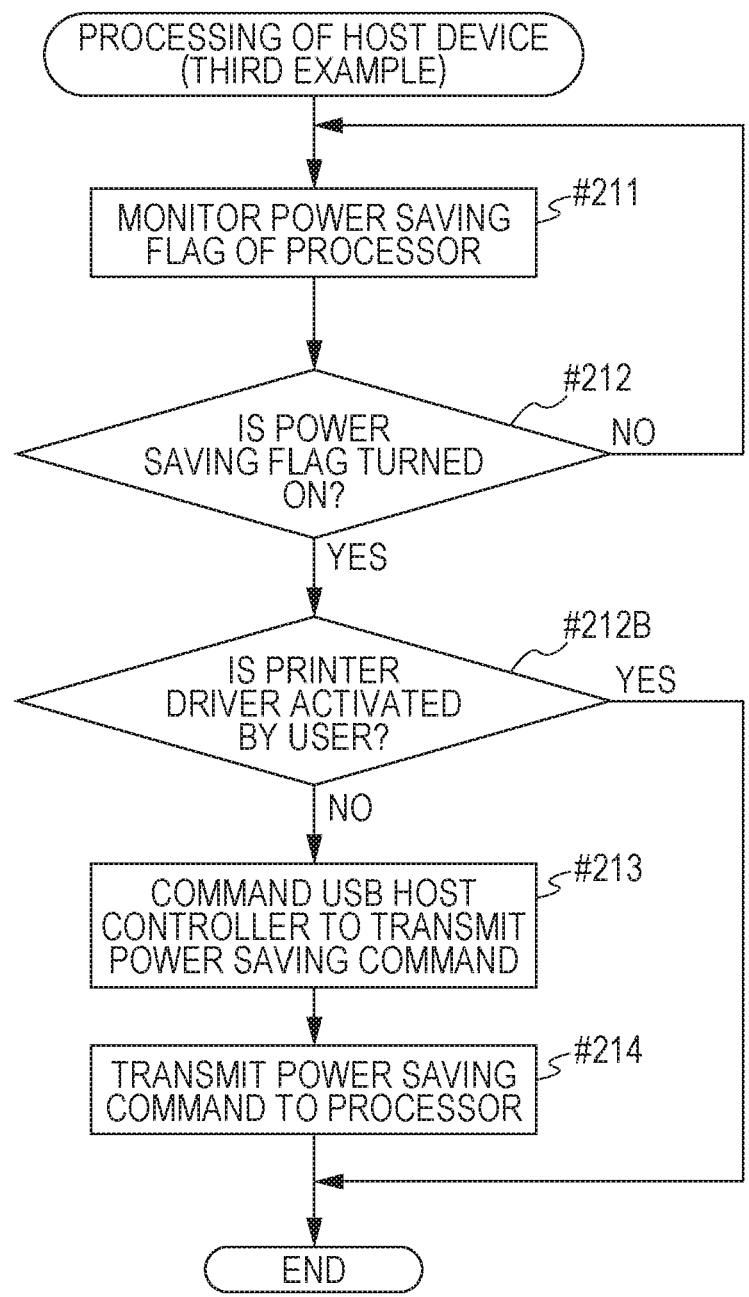
FIG. 10 is a flowchart illustrating a flow of a third example of the processing in the host device.

In FIG. 10, the flow of a third example of the processing in the host device 2 is illustrated.

The polling of detecting the state of the power saving flag Fp is performed (#211) as with the first example of FIG. 7. When the flag on state is detected (YES in #212), it is checked whether or not the printer driver 50 (or the other device driver) is activated in the host device 2 (#212B), differently from the first example. This is because there is a case where the polling is performed at a predetermined cycle, and then, the printer driver 50 is activated by the user within a period from the setting of the power saving flag Fp to the detecting of the flag on state.

In a case where the printer driver 50 is activated (YES in #212B), the processing of the flow of FIG. 10 ends. That is, the power saving command SS is not transmitted even in the flag on state. Accordingly, the device side USB interface 43 is retained in the normal state, and thus, when the user instructs the execution of the printing, the printing can be rapidly started by omitting connection confirmation of communication.

In a case where the printer driver 50 is not activated by the user (NO in #212B), the USB host controller 231 is commanded to transmit the power saving command SS (#213), and transmits the power saving command SS to the processor 3 (#214).

Figure 11:
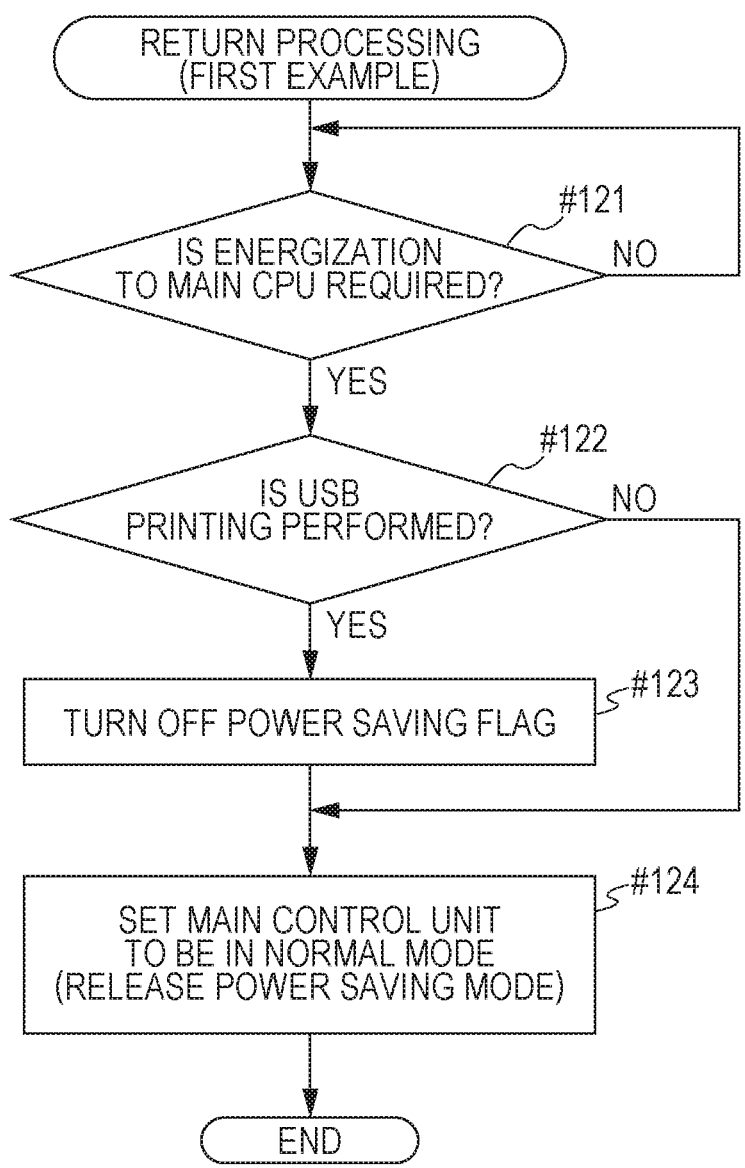
FIG. 11 is a flowchart illustrating a flow of a first example of return processing in the processor.

In FIG. 11, the flow of a first example of the return processing in the processor 3 is illustrated.

It is checked whether or not the energization to the main CPU 301 is required (#121). That is, it is checked whether or not a factor to return the main CPU 301 to the normal mode, such as the operation of the operation panel 35 or the access from the external equipment including the host device 2, is generated.

In a case where the energization is required (YES in #121), it is checked whether or not the reason is the execution of processing using the USB interface 41 in the data transmission as with the USB printing (#122).

In a case of YES in Step #122, the power saving flag Fp is turned off (#123), and the operating mode of the main CPU 301 is in the normal mode (#124).

In a case of NO in Step #122, that is, in a case where processing not using the USB interface 41 is executed, the power saving flag Fp is not turned off, and the operating mode of the main CPU 301 is in the normal mode (#124). In a case where the power saving flag Fp is turned off once, and then, is set again, the flag on state is detected by the polling, and thus, the flag on state may not be detected until a period of time for up to one cycle of the polling has elapsed. In a period where the flag on state is not detected, in order to prevent the power from being wastefully consumed without being capable of allowing the main CPU 301 to proceed to the power saving state again, the power saving flag Fp is left to be set.

Figure 12:
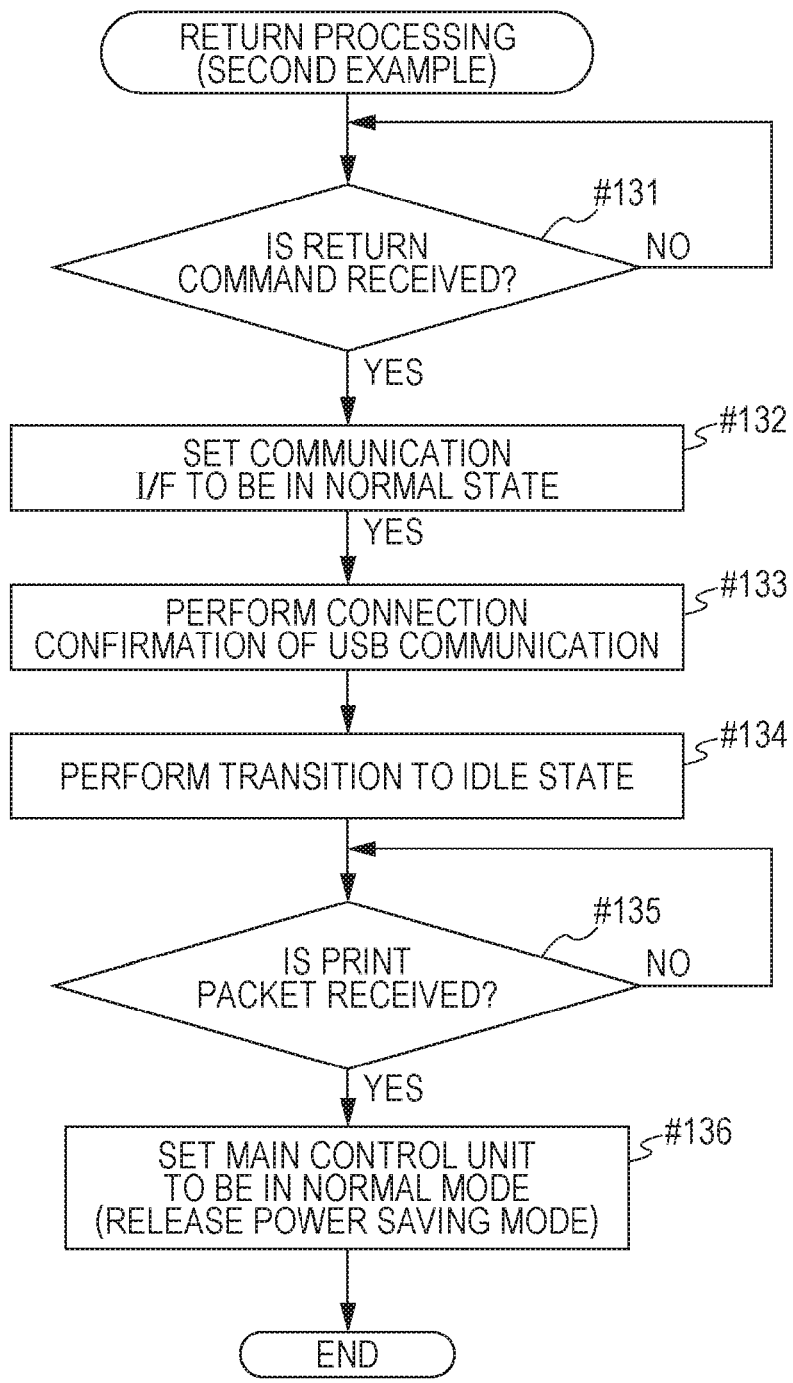
FIG. 12 is a flowchart illustrating a flow of a second example of the return processing in the processor.
Figure 13:
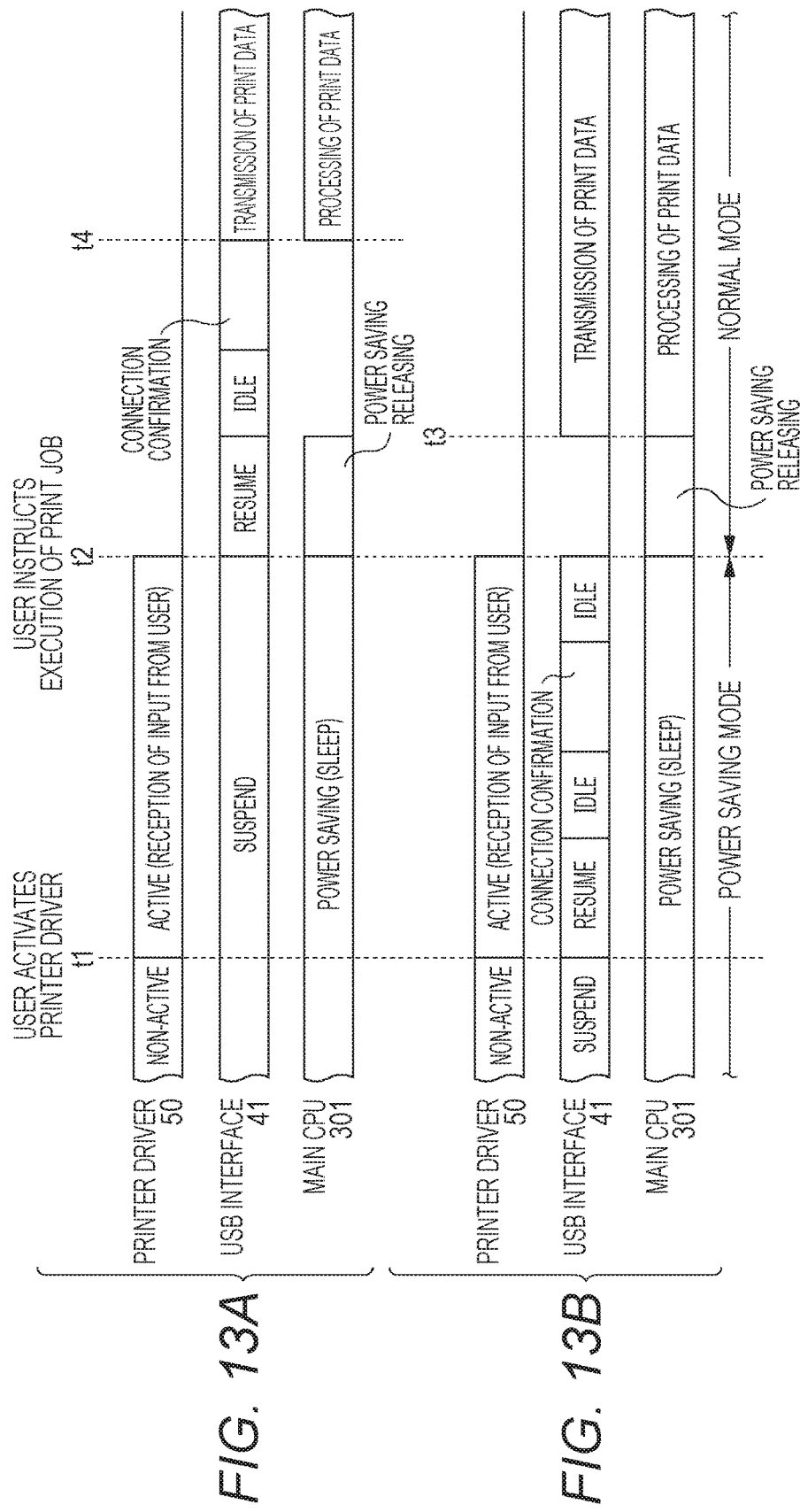
FIGS. 13A and 13B are timing charts illustrating a return timing to a normal mode.

In FIG. 12, the flow of a second example of the return processing in the processor 3 is illustrated, and in FIGS. 13A and 13B, a return timing to the normal mode is illustrated. Furthermore, FIG. 13A illustrates a timing of the related art, and FIG. 13B illustrates a timing corresponding to the flow of FIG. 12.

In FIG. 12, the processor 3 waits for the reception of the return command SR from the host device 2 (#131). When the return command SR is received (YES in #131), the processor 3 returns the device side USB interface 43 to the normal state (#132). This is processing of setting the device side USB interface 43 to be in an idle state where the communication can be performed but the data transmission is not performed.

When the USB interface 43 is in the idle state, the connection confirmation of USB communication with the host device 2 is performed (#133). When the connection confirmation ends, the USB interface 43 is transitioned to the idle state once (#134).

The processor 3 waits for a request of the execution of the processing (#135). For example, a print packet is a request of the execution of the printing processing (a print job). When the request is received (YES in #135), the operating mode of the main CPU 301 is allowed to proceed to the normal mode from the power saving mode (#136).

As illustrated in FIG. 13B, in a time t2, when the user instructs the printer driver 50 to execute the print job, the print packet is transmitted to the processor 3. According to this, in the processor 3, the power saving mode of the main CPU 301 is released, and the main CPU 301 proceeds to the normal mode. In a time t3 after the proceeding is completed, the transmission of print data to the processor 3 from the host device 2 is started, and processing for printing an image on the basis of the print data is performed by the main CPU 301.

As illustrated in FIG. 13B, in a time t1 before the time t2, the proceeding (the resume) of the USB interface 41 to the normal state from the power saving state is started. The time t1 is a timing at which the user activates the printer driver 50. Thus, the resume of the USB interface 41 is started before returning the main CPU 301 to the normal mode, and thus, it is possible to end the connection confirmation before the time t2. The transmission of the print data is rapidly started, and thus, it is possible to shorten a period of time from the printing instruction of the user to the end of the first printing. That is, it is possible to improve the performance of first print output time (FPOT).

In contrast, as illustrated in FIG. 13A, in the related art, a time at which the resume of the USB interface 41 is started is set to the time t2 at which the user instructs the execution of the print job. In this case, the connection confirmation is performed after the resume is completed, and thus, a time t4 at which the transmission of the print data is started is later than the time t3 in FIG. 13B.

Furthermore, a period of time in which the USB interface 41 is in the normal state is longer in a case where the resume is started at the time t1 as illustrated in FIG. 13B than in a case where the resume is started at the time t2 as illustrated in FIG. 13A. However, a period of time in which the main CPU 301 is energized until the transmission of the print data is started is shorter in a case of FIG. 13B than in a case of FIG. 13A. Therefore, in a comprehensive manner, the USB interface 41 is switched to be in the normal state at the timing of FIG. 13B, and thus, it is possible to save the power.

Figure 14:
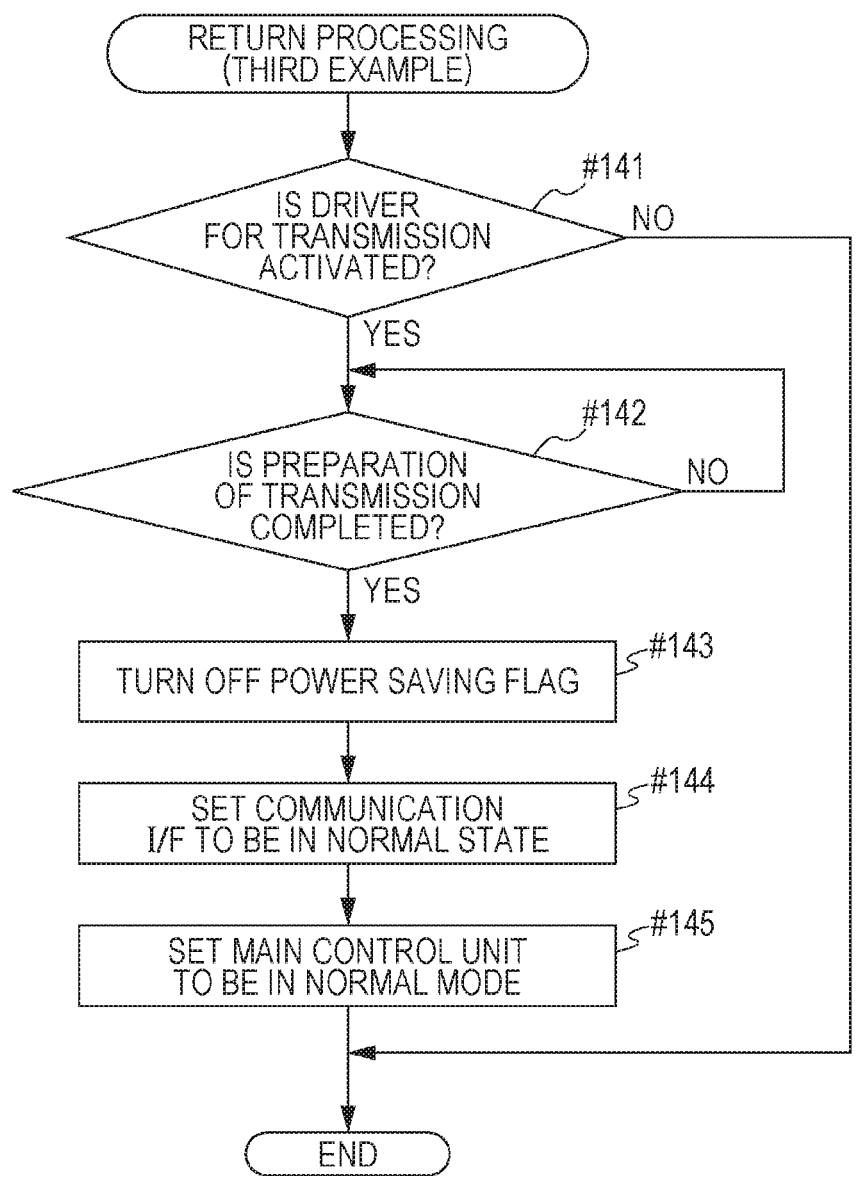
FIG. 14 is a flowchart illustrating a flow of a third example of the return processing in the processor.

In FIG. 14, the flow of a third example of the return processing in the processor 3 is illustrated.

It is checked whether or not a driver for transmission is activated in the host device 2 (#141). The driver for transmission is a device driver which is capable of requesting processing of reading out an image from a document sheet and of transmitting image data thereof to the host device 2 to the processor 3. The TWAIN driver 52 dedicated for the processor 3 is an example of the driver for transmission.

In a case where the driver for transmission is activated (YES in #141), the processor 3 waits for the completion of the preparation of transmitting the image data (#142). At this time, when it is detected that the document sheet is set on the basis of the output from the sensors 331 and 341, it is determined that the preparation of the transmission is completed.

When the preparation of the transmission is completed (YES in #142), the power saving flag Fp is turned off (#143), and the device side USB interface 43 is in the normal state (#144). After that, the main CPU 301 is allowed to proceed to the normal mode (#145).

By returning the device side USB interface 43 and the main CPU 301 to the normal state after the preparation of the transmission is completed, it is possible to reduce power consumed during the preparation.

Figure 15:
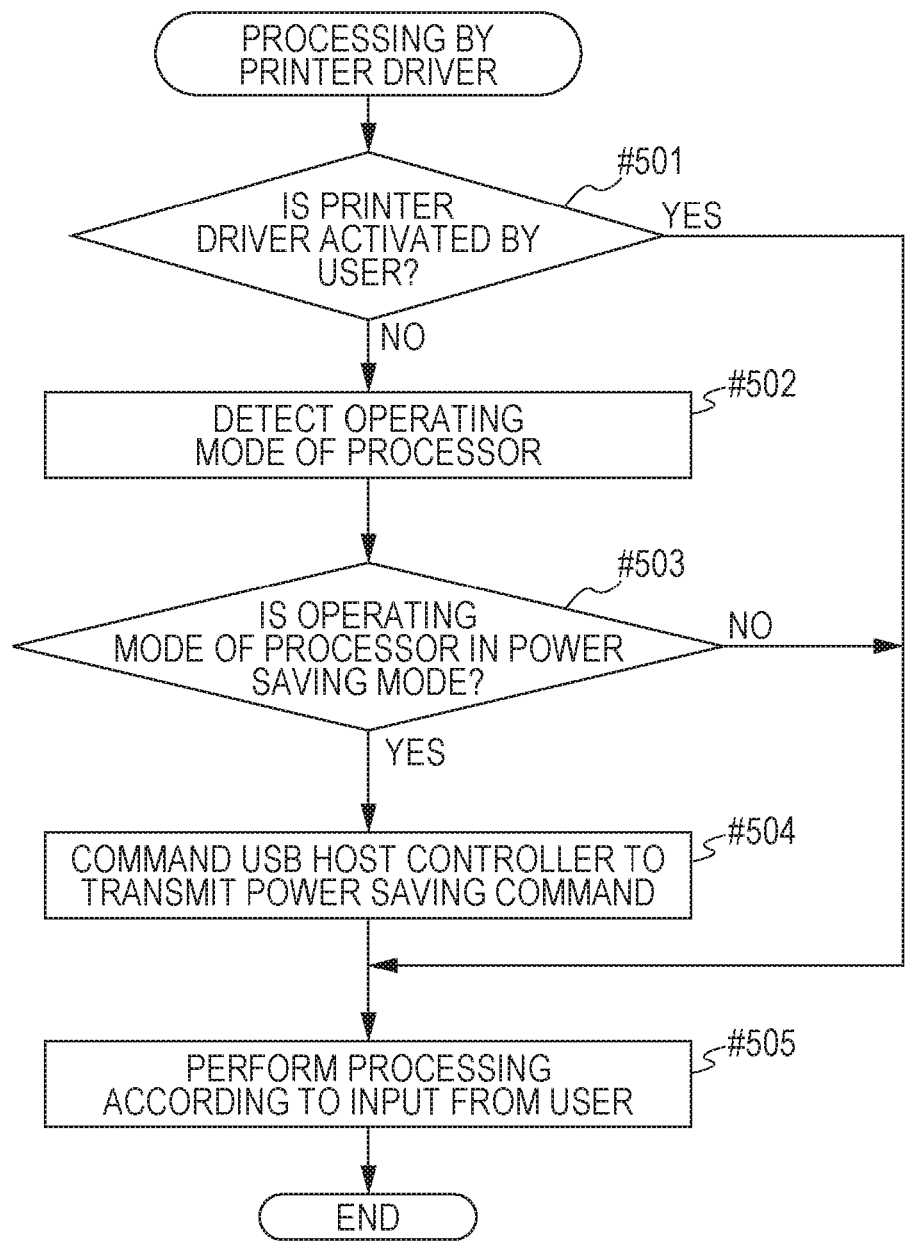
FIG. 15 is a flowchart illustrating a flow of processing which is executed by a printer driver.

In FIG. 15, the flow of the processing which is executed by the printer driver 50 is illustrated.

It is checked whether or not the printer driver 50 is activated by the user (#501). In a case where the printer driver 50 is activated by the user (YES in #501), the process proceeds to Step #505, and the processing is performed according to the input from the user. For example, the status of the processor 3 as the printer is examined and displayed, setting such as the number of sheets to be printed is changed, or the instruction of executing the print job is received. Furthermore, when the user instructs the execution of the print job or instructs the end of the display on the screen, the printer driver 50 ends the display on the screen and is in a state where the input from the user is not received.

In a case where the printer driver 50 is not activated by the user (NO in #501), that is, in a case where the printer driver 50 is automatically activated at the time of turning on the host device 2 and is in a state of performing the processing in the background, the operating mode of the processor 3 is detected (#502). The detection of the operating mode may be the detection of the state of the power saving flag Fp, or may be the detection of the presence or absence of the power saving notification from the processor 3.

In a case where the operating mode of the processor 3 is in the power saving mode (YES in #503), the suspend issue command CS is imparted to the USB host controller 231 as the command processing of commanding the host device 2 to transmit the power saving command SS (#504). Then, the process proceeds to Step #505, and the processing according to the input from the user is performed.

According to the embodiment described above, it is possible to allow the device side USB interface 43 as the communication interface, which is not capable of uniquely controlling the power consumption, to proceed to the power saving state as necessary, and to further save the power of the processor 3 compared to the related art.

In the embodiment described above, a configuration has been described in which the USB device controller 303 is integrated in SoC along with the main CPU 301 and the like, but the USB device controller 303 may be separated from the main control unit. The processor 3 is not limited to the complex machine, but may be a copying machine, a printer, an image reading device, and other equipment. A connecting unit for communication is not limited to the USB cable 4, but may be a wireless USB line. The present invention is not limited to an interface for USB communication, but can be applied to power saving of a processor including a communication interface which is not capable of uniquely controlling power consumption.

The entire configuration of each of the processing system 1, the host device 2, and the processor 3 or the configuration of each unit, the contents of the processing, the sequence, the timing, or the like can be suitably changed according to the gist of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A processor capable of executing predetermined processing, the processor comprising:
   a communication interface comprising a memory and a communication interface controller which controls communication with a host device which requests execution of the processing; and
   a main CPU configured to control the execution of the processing,
   wherein the communication interface controller is configured to execute processes comprising:
      a notification process in which the communication interface, without proceeding to a power saving state, executes notification processing for allowing the host device to detect that an operating mode of the main CPU is a power saving mode, when the main CPU proceeds to the power saving mode in which power consumption is reduced; and
      a state switching process to allow the communication interface to proceed to the power saving state in which power consumption is smaller than in a normal state when the communication interface receives a power saving command from the host device, and to allow the communication interface to proceed to the normal state from the power saving state when the communication interface receives a return command from the host device,
   wherein the notification process sets a power saving flag indicating that the operating mode of the main CPU is in the power saving mode in the memory, which is able to be monitored by the host device, as the notification processing, wherein the notification process switches the power saving flag to be in a flag off state in which the power saving flag is not set when the state switching process allows the communication interface to proceed to the normal state, wherein the main CPU proceeds to a normal mode in which power consumption is larger than in the power saving mode when the communication interface proceeds to the normal state, and wherein, in a case where the main CPU proceeds to the normal mode when the communication interface is in the power saving state, the notification process retains a flag on state in which the power saving flag is set, and the state switching process retains the communication interface in the power saving state.

2. The processor according to claim 1, wherein:
the communication with the host device is USB communication using the processor as a USB device, and
the communication interface controller comprises a USB device controller.

3. The processor according to claim 1, wherein the notification process does not set the power saving flag in a case where software for requesting the execution of the processing in the host device is in a state of receiving input from a user.

4. The processor according to claim 1, wherein in a case where software requesting execution of transmitting data to the host device as the execution of the processing is activated in the host device in a state in which the operating mode of the main CPU is the power saving mode, the state switching process allows the communication interface to proceed to the normal state.

5. The processor according to claim 4, wherein the state switching process waits for completion of preparation of transmitting the data, and allows the communication interface to proceed to the normal state.

6. A power saving method of a USB device including a main CPU and a device side USB interface for communicating with a USB host, the method comprising:
when the main CPU proceeds to a power saving mode in which power consumption is reduced, requesting transmission of a suspend command to the USB host, without the device side USB interface proceeding to a suspend state, by setting a power saving flag indicating that the main CPU is in the power saving mode in a memory of the device side USB interface, which is able to be monitored by the USB host;
when the device side USB interface receives the suspend command from the USB host, allowing the device side USB interface to proceed to the suspend state;
when the device side USB interface receives a return command from the USB host, allowing the device side USB interface to proceed to a normal state, and switching the power saving flag to be in a flag off state in which the power saving flag is not set;
when the device side USB interface proceeds to the normal state, allowing the main CPU to proceed to a normal mode in which power consumption is higher than in the power saving mode; and
in a case where the main CPU proceeds to the normal mode when the device side USB interface is in the suspend state, retaining a flag on state in which the power saving flag is set, and retaining the device side USB interface in the suspend state.

7. A non-transitory recording medium storing a computer readable program used in a processor capable of executing predetermined processing, the processor comprising a main CPU and a communication interface, and the program causing the processor to execute:
a notification process in which the communication interface, without proceeding to a power saving state, executes notification processing for allowing a host device, which requests execution of the processing to the processor, to detect that an operating mode of the main CPU is a power saving mode, when the main CPU which controls the execution of the processing proceeds to the power saving mode in which power consumption is reduced; and
a state switching a process to allow the communication interface to proceed to the power saving state in which power consumption is smaller than in a normal state when the communication interface, which communicates with the host device, receives a power saving command from the host device, and to allow the communication interface to proceed to the normal state from the power saving state when the communication interface receives a return command from the host device,
wherein the notification process sets a power saving flag indicating that the operating mode of the main CPU is in the power saving mode in the memory, which is able to be monitored by the host device, as the notification processing,
wherein the notification process switches the power saving flag to be in a flag off state in which the power saving flag is not set when the state switching process allows the communication interface to proceed to the normal state,
wherein the main CPU proceeds to a normal mode in which power consumption is larger than in the power saving mode when the communication interface proceeds to the normal state, and
wherein, in a case where the main CPU proceeds to the normal mode when the communication interface is in the power saving state, the notification process retains a flag on state in which the power saving flag is set, and the state switching process retains the communication interface in the power saving state.

* * * * *